United States Patent [19]

Jordan

[11] 4,218,035

[45] Aug. 19, 1980

[54] SEMI-SUPINE AIRCREW EJECTION SEAT

[75] Inventor: William I. D. Jordan, Surbiton, England

[73] Assignee: Hawker Siddeley Aviation Limited, Kingston-Upon-Thames, England

[21] Appl. No.: 876,028

[22] Filed: Feb. 8, 1978

[30] Foreign Application Priority Data

Feb. 14, 1977 [GB] United Kingdom ............... 6018/77

[51] Int. Cl.² ............................................. B64D 25/10
[52] U.S. Cl. ........................... 244/122 AC; 244/122 A
[58] Field of Search ........ 244/122 R, 122 A, 122 AB, 244/122 AC, 122 AE, 141

[56] References Cited

U.S. PATENT DOCUMENTS

| 2,516,902 | 8/1950 | Musser | 244/122 AC |
|---|---|---|---|
| 2,702,677 | 2/1955 | Replogle | 244/122A |
| 3,115,320 | 12/1963 | Hirt | 244/141 X |
| 3,981,465 | 9/1976 | Sinnett et al. | 244/122 A |

*Primary Examiner*—Barry L. Kelmachter
*Attorney, Agent, or Firm*—Ira C. Edell

[57] ABSTRACT

A reclining or semi-supine aircrew ejection seat is provided with an ejection gun that is in the usual upwardly extending and rearwardly inclined attitude, and the seat is attached to the portion of the gun assembly that leaves the aircraft by a pivotal connection between the back of the seat and the upper part of the gun assembly portion. This allows the part of the seat that supports the user's back to extend forward away from the pivotal connection and the gun assembly. During the initial phase of ejection, the seat turns angularly, bringing the part of the seat that supports the user's back against the gun assembly.

2 Claims, 3 Drawing Figures

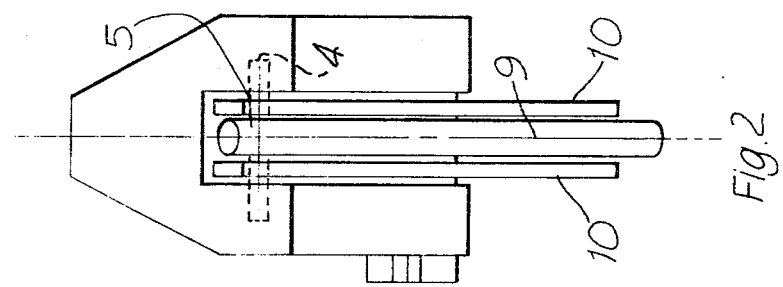
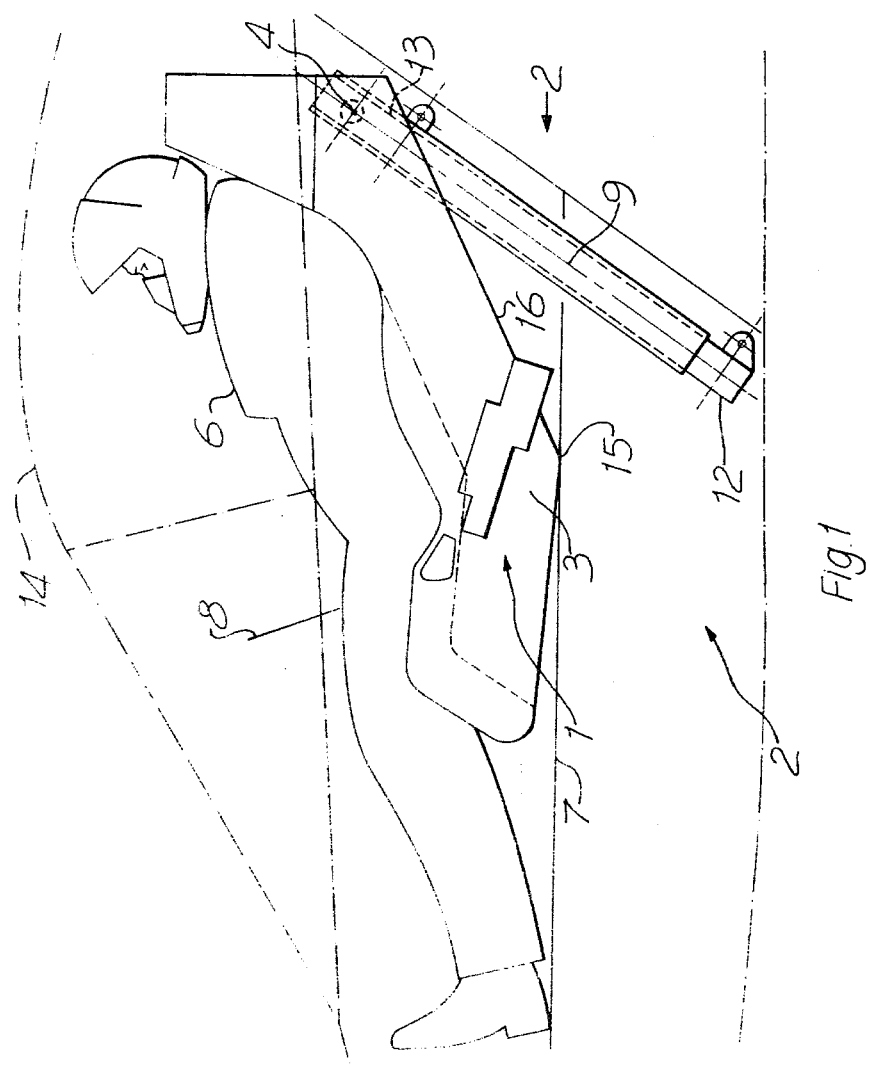

SEMI-SUPINE AIRCREW EJECTION SEAT

This invention relates to aircrew ejection seats. More particularly, it concerns a reclining or semi-supine ejection seat.

Before in airman can be safely ejected from an aircraft it is generally necessary to form an ejection opening in the cockpit canopy at least sufficiently large to permit passage therethrough of the ejection seat and its occupant. With conventional ejection seat arrangements the seat may be mounted within the aircraft with the seat back frame extending in an upward but rearwardly inclined direction, slidably engaging one or more guides or beams located within the aircraft and interconnected to an ejection gun designed to launch the seat from the aircraft in an upward direction. The gun comprises relatively slidable or telescopic parts, one part being adapted to be anchored to the aircraft and a further part, anchored to the seat, designed to carry the ejection seat from the aircraft when the gun is fired. The whole installation is arranged such that the seat frame, guides and gun lie substantially parallel to each other.

There is a requirement for a pilot or other crewman to be seated in a reclining or semi-supine position, there being a number of significant advantages inherent in this arrangement particularly when applied to high-speed manoeuvring aircraft. A semi-supine attitude permits an increase in human tolerance to a sustained acceleration, referred to as a higher 'g' capability. Furthermore, the lower fuselage depth taken by the pilot maximises useful fuselage volume or permits an improved fuselage configuration with an associated reduction in induced aerodynamic drag, for example.

Whilst this would provide an ideal ejecting posture, giving minimal risk of back injury, seat movement substantially normal to the fuselage horizontal datum would necessitate a large ejection path. This would introduce undesirable delay because of the need to clear the path of the cockpit canopy as a whole, in addition to the removal of instrument displays which may be located above the crew member's legs.

Therefore it would be desirable to combine the advantages of a semi-supine seat with a conventional ejection arrangement and it is an object of the present invention to achieve such an advantageous arrangement.

According to the invention, the ejection gun is in the usual upwardly extending and rearwardly inclined attitude, and the semi-supine seat is attached to the gun by means of a pivotal connection in an arrangement such that the seat both rotates and travels rearward during the initial part of the ejection sequence.

One arrangement according to the invention will now be described by way of example and with reference to the accompanying drawings, in which:

FIG. 1 shows in side elevation a semi-supine ejection seat arrangement.

FIG. 2 is an end view of this arrangement in the direction of arrow 2 in FIG. 1.

Figure 3:
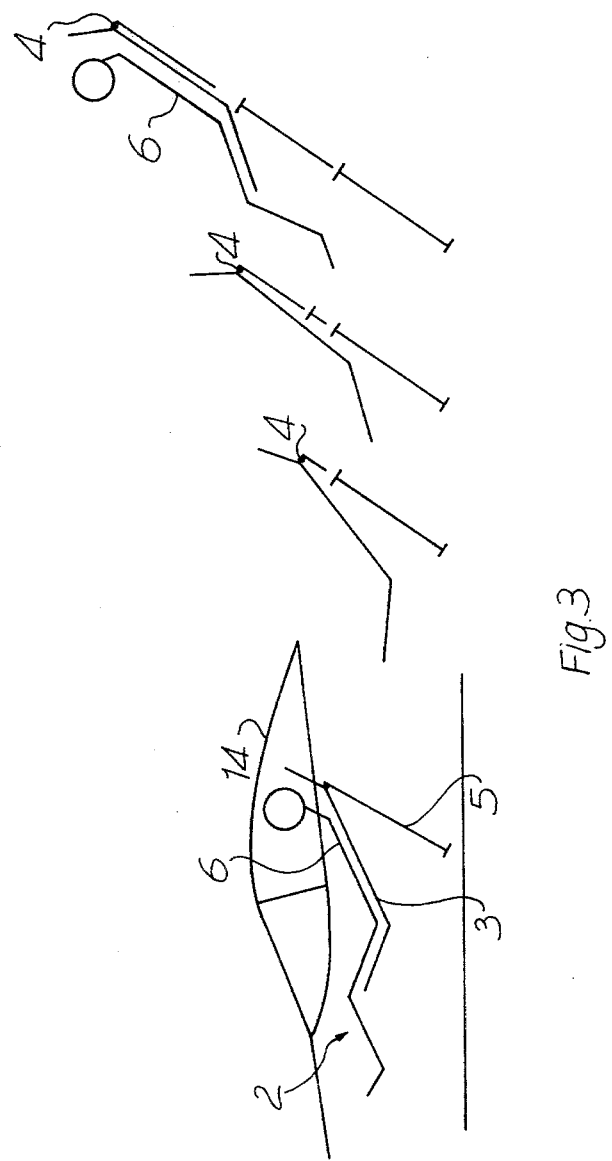
FIG. 3 is a diagrammatic representation of the ejection seat operating sequence.

Referring to the drawings, a reclining or semi-supine ejection seat arrangement 1 is located in an aircraft cockpit 2 and comprises a semi-supine seat 3 having attachment by means of a pivot 4 to an ejection gun assembly 5.

The seat 3 is optimised in form to accommodate differing sizes of crew member 6 and its physical attitude and fore and aft location ensures adequate clearance between the crew member and an instrument panel 8 passing over his legs. It is structurally supported on the cockpit floor 7 but is able to slide, at 15, for making rearward movement as part of the ejection sequence accompanied by limited rotation, anti-clockwise as viewed in FIG. 1, about the pivot 4.

Whilst the seat is positioned to maintain the crew member 6 substantially in alignment with the aircraft horizontal datum, the gun 5 extends in an upward but rearwardly inclined direction. The inclined gun axis 9 is in the vertical centre plane of the aircraft.

The ejection gun assembly 5, designed to launch the seat from the aircraft, comprises relatively slidable or telescopic parts, one part 12 being fixed and a further part 13 bearing at its upper end the pivot 4 and designed to carry the ejection seat from the aircraft when the gun is fired. On opposite sides of the part 13 of the gun are two frame members 10 parallel thereto. The cockpit is enclosed by a transparent canopy 14.

On initiation of the ejection sequence, an opening is formed in the cockpit canopy by one or more available means. Substantially instantaneously, the ejection gun 5 is detonated forcing the slidable portion 13 upwards along the gun axis 9. The installed angle of the gun will cause vertical and horizontal load components of the explosive force at the pivot 4, inducing anti-clockwise seat rotation about this pivot point combined with upward seat movement. This will produce rearward translation of the seat, rotation continuing until the seat back baseline 16 engages the frame members 10 when the seat will have adopted a conventional ejecting attitude and will continue to be drawn upwards until clear of the aircraft. The effective rearward translation of the seat during the initial part of the sequence ensures that the crew member is clear of all obstruction before significant upward seat movement is achieved.

I claim:

1. A semi-supine aircrew ejection seat, comprising an ejection gun to be installed extending in an upwardly and rearwardly inclined attitude with an inclination which is constant for all seat positions and having two telescopically-sliding parts a first of which remains anchored in the aircraft while the second leaves the aircraft in an upward and rearward direction on ejection, and a seat assembly having lower and upper portions which support the seat and back respectively of the user and the upper portion of which is connected by a pivotal connection to said second part of said ejection gun so as to be angularly movable relatively thereto, said upper seat portion, in the installed position, extending from said pivotal connection in a downward and forward direction away fron said gun at an acute angle thereto, whereby during the initial phase of ejection angular movement of the seat assembly about said pivotal connection as said second part of said ejection gun slides relatively to said first part automatically brings said lower portion of said seat assembly rearward towards said gun.

2. A seat according to claim 1, wherein the ejection gun is flanked by frame members extending parallel to the gun, and during the initial phase of ejection the angular movement of the seat brings said upper portion of the seat against said frame members.

* * * * *